(12) United States Patent
Westberg

(10) Patent No.: US 6,856,602 B1
(45) Date of Patent: Feb. 15, 2005

(54) METHOD AND SYSTEM FOR COMMUNICATION

(75) Inventor: Lars Westberg, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 877 days.

(21) Appl. No.: 09/594,819

(22) Filed: Jun. 16, 2000

(30) Foreign Application Priority Data

Jun. 18, 1999 (SE) .............................................. 9902336

(51) Int. Cl.[7] .............................................. H04L 12/28
(52) U.S. Cl. .................................................... 370/254
(58) Field of Search ................................ 370/254, 255, 370/256, 257, 258, 328, 329, 401; 709/220, 221, 222, 226, 229

(56) References Cited

U.S. PATENT DOCUMENTS

| | | | | |
|---|---|---|---|---|
| 5,918,016 A | * | 6/1999 | Brewer et al. .............. | 709/220 |
| 6,014,380 A | * | 1/2000 | Hendel et al. .............. | 370/392 |
| 6,070,187 A | * | 5/2000 | Subramaniam et al. ..... | 709/220 |
| 6,125,108 A | * | 9/2000 | Shaffer et al. .............. | 370/259 |
| 6,324,577 B1 | * | 11/2001 | Hirai .......................... | 709/223 |
| 6,335,926 B1 | * | 1/2002 | Silton et al. ................ | 370/351 |
| 6,490,273 B1 | * | 12/2002 | DeNap et al. .............. | 370/352 |
| 6,515,997 B1 | * | 2/2003 | Feltner et al. .............. | 370/401 |
| 6,643,292 B2 | * | 11/2003 | Chapman et al. ...... | 370/395.52 |

OTHER PUBLICATIONS

Newton's Telecom Dictionary, 14th Edition, p. 557.*
International Search Report corresponding to International Application No. SE/00/00760 mailed Oct. 20, 2000.

Tanenbaum A.S., "Computer Networks" 1996, Prentice Hall PTR, Upper Saddle River, New Jersey 07465 XP002123910, p. 424, paragraph 2, p. 429, paragraph 1.

Ambardar S. et al., "Dynamic Router Configuration Management for Wireless Mobile Environments" Proceeding Rawcon 98. 1998 IEEE Radio and Wireless Conference (Cat. No. 98EZ194), Colorado Springs, CO, USA, Aug. 9–12, 1998, pp. 31–34.

McGregor G, "The PPP Internet Protocol Control Protocol (IPCP)" Network Working Group, Request for Comments, 1332 [Online], May 1992 (XP002123909; pp. 1–14.

* cited by examiner

Primary Examiner—Kwang B. Yao

(57) ABSTRACT

Method for auto-configuration of a new router when added to an IP intranetwork, the IP intranetwork formed by routers interconnected via point-to-point links. The method includes the steps of 1) establishing a physical connection between the new router and an existing router within the intranetwork; 2) establishing a point-to-point link between the new router and the existing router, over the physical connection; 3) requesting and retrieving an IP address to make IP communication possible between the new router and the existing router the point-to-point link; 4) automatically identifying the resources which are essential for retrieving configuration information for the new router; 5) automatically configuring the new node by means of the configuration information; and 6) starting a routing protocol to establish network connectivity between the new router and the rest of the intranetwork.

7 Claims, 7 Drawing Sheets

METHOD AND SYSTEM FOR COMMUNICATION

FIELD OF INVENTION

This invention relates to the field of IP (Internet Protocol) intranetworks and more specifically to a method, an IP intranetwork and a router for auto configuration of routers in a communication system.

DESCRIPTION OF RELATED ART

Services that provide autoconfiguration for hosts on IP-based LANs are available and widely used.

Several protocols and services have been developed to perform autoconfiguration in IP-networks. Most of the existing solutions for IP-autoconfiguration are however designed only for LANs (Local Area Networks) and do not deal with WANs (Wide area Networks) and routers. The DHCP (Dynamic Host Configuration Protocol) RFC does even say specifically that routers should NOT be autoconfigured. According to the DHCP FAQ (Frequently Asked Questions) the reasons are that routers should not depend on other servers to function, and that in maintaining and troubleshooting routers it is important to know their exact configuration rather than to rely on an autoconfigured one.

For LANs this is true, routers are few and it is not a big problem to manually configure them. In a WAN, on the other hand, routers are frequent and some kind of autoconfiguration seems necessary.

Network Scenario:

Most of the time the transmission network is static. Changes occur when the network is expanded with a new host or router. When a new node is connected to an existing router in the WAN it needs to be configured. The first step is to configure the node to work as a host but it must also prepare for router operation when another node is connected in cascade. In another case there can be several nodes in cascade that are added at the same time, and one by one has to be configured to act like a router. In these network scenarios the hosts are added dynamically.

Several well-known protocols for automatic configuration will now be described. Some explanation is given to why some of these protocols are not relevant to the network scenario mentioned above.

ARP/RARP, Address Resolution Protocol and Reverse Address Resolution Protocol, are only used in networks that have physical link layer addresses like Ethernet and Token Ring. The protocols are used when resolving a physical address from an IP-address and when resolving an IP-address from a physical address.

ARP is used all the time when a host is sending IP-datagrams to another host on the same physical network. The sending host does an ARP request for the receiver's physical address and then sends the IP-datagram to the physical address.

RARP is used for automatic configuration. When a host that doesn't know its IP-address starts up, it sends out a RARP request containing its own physical address (which is known). A RARP server, that has a database containing physical addresses and the corresponding IP-addresses, answer the request by sending the IP-address to the host All ARP/RARP communication is performed on the physical layer, using physical layer packets. The amount of information that can be sent in a RARP response is therefor limited by the physical layer packet size. The Point to Point links that will be used in the present network scenario do not have physical layer addresses and thus do not have ARP/RARP.

The BOOTP Bootstrap Protocol is like RARP used for automatic configuration, but BOOTP is more sophisticated than RARP. While RARP only provides the host with an IP-address, BOOTP can also send other configuration parameters like default router, subnet mask, a TFTP (Trivial File Transfer Protocol) server address and other configurable information. A BOOTP server provides the information that is given to a host. All information including the host's IP-address must be preconfigured in the BOOTP server; thus BOOTP is no help in adding hosts dynamically.

BOOTP communication is done using UDP (User Datagram Protocol)/IP datagrams. When a host starts up and needs to be configured, it broadcasts a BOOTP request on its subnet. The BOOTP request contains an identifier-string that uniquely identifies the host. Often the host's physical layer address is used. A BOOTP server picks up the request and matches the identifier against its database. If the server holds configuration information for the host, a BOOTP response is sent back by broadcast.

Since BOOTP depend on UDP/IP datagrams, the host that is to be configured must be able to send and receive IP-datagrams by broadcast before it is configured with an own IP-address. The PPP-links that will be used in the present network scenario can't send or receive IP-datagrams until the link is configured with an IP-address.

DHCP, Dynamic Host Configuration Protocol is based on BOOTP and is very similar, but also provide functionality for dynamic adding of hosts to a network. When a DHCP server receives a request for an IP-address from a host that is unknown, the server selects an IP-address from its pool of free addresses and gives to the host for a time limited lease. The host then has to send another request to renew the lease before the time limit is due. The DHCP server stores information about leased IP-addresses in a database. So when a request from a known host is received, the same IP-address as the host had last time can be sent in the response.

Like BOOTP, DHCP does not work over PPP-links.

IPCP, IP Control Protocol is one of the protocols in the family of network layer control protocols in PPP. Once the Point to Point link layer is established, the network layer control protocol is used to configure the necessary properties for the network layer, IP in the present network.

IPCP provide options for configuration of IP-address, IP-compression-protocol and DNS servers. How the assigned IP-address is selected depends on the PPP-server implementation. One possibility is that the address can be retrieved from a DHCP server. In that case the PPP-server is acting like a DHCP-client.

The DNS, Domain Name System translates Internet host names into IP-addresses and the other way around. Whenever an application needs to communicate with another host for which only a host name is known, a DNS lookup of the IP-address must first be performed. The DNS lookup is usually done by a resolver-service in the TCP/IP implementation of the host's operating system. The resolver sends a request to a DNS-server that is normally located on the local network. The resolver needs to be preconfigured with IP-addresses to a primary and a secondary DNS-server. The DNS-server looks up the requested IP-address from its database of name to address mappings and sends a reply back to the resolver.

On larger networks, like the Internet, DNS-servers are connected in a hierarchical way. Lower level servers forward requests for hosts that are unknown to them upward in the hierarchy. Higher level servers are aware of all servers on lower levels and what hosts are handled by them. On the top-level there are one top server for each internet-top-domain (like .se, .com and net). The top-servers know of all other top servers and can forward requests to the appropriate server. All servers cache results of forwarded requests for better performance.

The DNS-servers must be configured with name to address and address to name mappings for all the hosts that the server is responsible for. This configuration has previously been very static which cause problems when DNS is used together with DHCP If a host gets a new IP-address via DHCP, its DNS-mappings do not longer apply. Extensions to DNS and DHCP allow that a host requests that the DHCP server should update the DNS mappings.

TFTP Trivial File Transfer Protocol is a simple version of the File Transfer Protocol (FTP). TFTP is often used to transfer configuration data to hosts and routers. Diskless hosts often use BOOTP or DHCP to retrieve its IP-address together with a TFTP IP-address and a path to a file on the TFT-server. The file that contains the host's Operating System is downloaded from the TFTP-server and started.

In the scenario where the amount of routers to be configured in a WAN increase, generating a lot of manual works, a more automated solution is needed.

SUMMARY OF THE INVENTION

The present invention relates generally to configuration of routers in a communication WAN and more particularly with the problems of substantial work with manual configuration of routers in a WAN and the need for automation of the configuration process.

A problem with autoconfiguration of a router is for the router to find addresses to essential resources provided with configuration information.

Accordingly it is an object of the present invention to unravel the above-mentioned problems.

The aforesaid problems are solved by means of a communication system wherein the router to be configured automatically finds essential resources where it obtains the configuration information.

The following scenario of auto configuring the router describes the inventive concept.

A new node is added to an existing router within the Intranet. The node is to be configured to act like a router. A physical connection and a Point to Point link are established between the existing router and the new node. A routing protocol is started to make it possible for the new node to send and retrieve IP traffic. The new node finds automatically the essential resources to receive configuration information. By means of the configuration information, the new node is automatically configured.

An advantage with the present invention is that no manual configuration is required.

Another advantage is that the present invention makes it possible to perform a remote configuration.

Another advantage is that the present invention makes it possible to configure the entire Intranet, i.e. make the configuration centralised, and to have the configuration servers placed at one central place within the intranetwork.

Yet another advantage with the present invention is that standard protocol can be used, there is no need for specifically designed protocols.

Another advantage with the present invention is that the configuration will be faster performed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERED EMBODIMENTS

Figure 1:
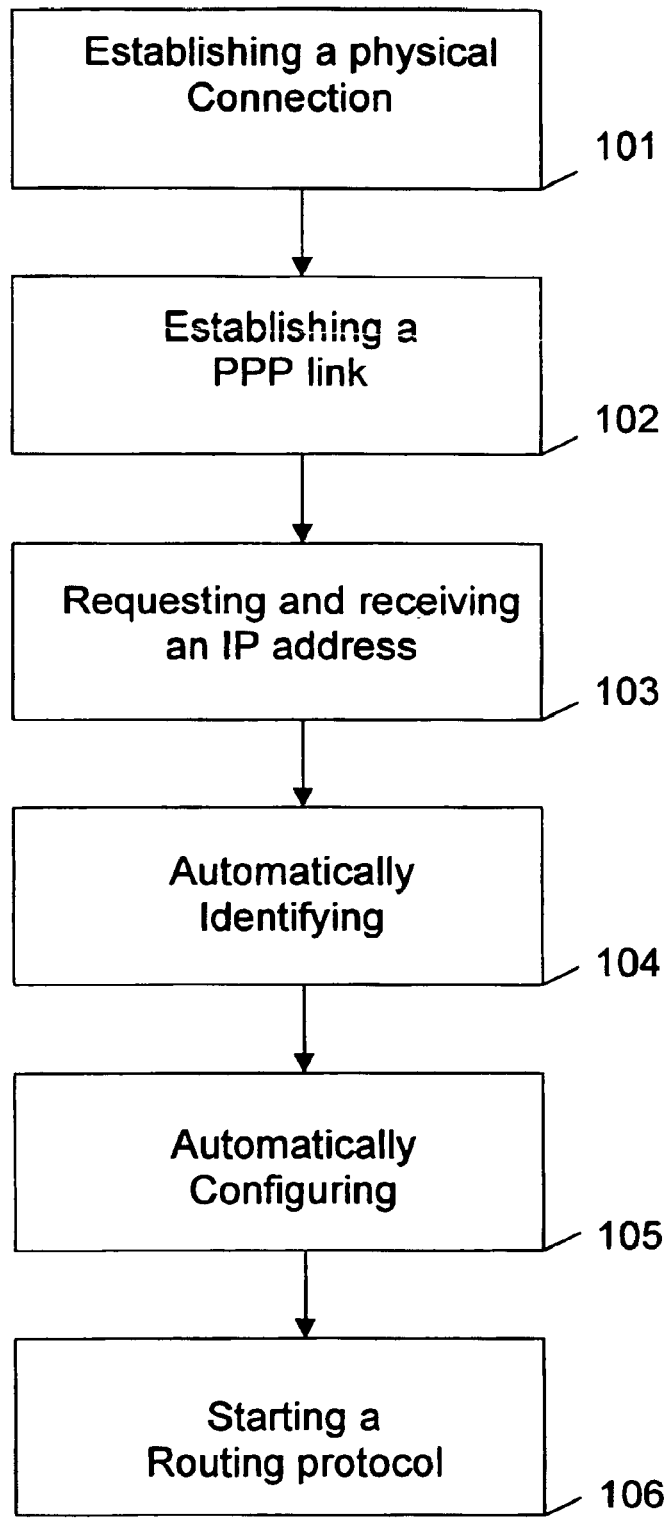
FIG. 1 shows a flowchart of the general method of the invention.

FIG. 1 shows a flowchart of a possible scenario of autoconfiguring a new node in an IP intranetwork to act like a router, e.g. when adding it to an existing router within the IP intranetwork. Configuring means downloading software, adjusting parameters and starting up. The first step is to establish 101 a physically connection between the new node and the existing router. Over the physical connection is a Point to Point link 102 established. One example is PPP (Point to Point Protocol) link but it is also possible to use another link protocol that supports IP. When Point to Point link has been established, the existing router becomes aware of the new node. To be able to make IP communication possible, the new node has to request an IP address 103 by means of the IPCP (IP Control Protocol) via the existing router to the DHCP (Dynamic Host Configuration Protocol) server. The new node does not know the DHCP IP, address, but the existing router, which first receives the request, knows the DHCP IP address, adds it to the request and sends it further to the DHCP server. The existing router also receives the answer of the IP address request, and forwards it to the new node. It is also possible to obtain a DNS IP address or a DHCP IP address simultaneously which might be useful later on.

To continue the configuration, the new node must be able to automatically identify 104 the addresses to essential resources on the intranetwork e.g. DNS (Domain Name System) server, a so-called DRC (Dynamic Router Configuration) server and a so-called RA (Resource Allocation) server which are provided with the essential configuration information, e.g. IP address, address mask, configuration information for the interface and intranetwork configuration information. DRC and RA will be described later. This can be performed in different ways, here presented in three different ways:

1. In one embodiment of the present invention preconfigured IP addresses are used. Within an Intranet, the same static addresses can be used for essential recourses on all routers within the network. The existing router is preconfigured with the addresses of the essential resources, thus making it possible for the new node to obtain the configuration information from the essential resources via the existing router.

2. In another embodiment of the present invention, the DNS and preconfigured host names are used. Standard host names are defined for all essential resources and preconfigured in all existing routers within the Intranet. Either the new node can request the existing router for the standard host names or the standard host names can be preconfigured in the new node. The new node then uses the DNS IP address, retrieved at the same time as the IP address 103, for sending a request for resolving the standard host names into IP addresses.

3. In yet another embodiment the DHCP (Dynamic Host Configuration Protocol) is used. This is possible if the DHCP service is extended to allow hosts that already have an IP address to retrieve configuration information. The new node contacts DHCP and retrieves IP addresses to the essential resources. The DHCP IP address is retrieved at the same time as the IP address 103.

After downloading the configuration information to the new node and setting of relevant parameters within the new node, a routing protocol is started e.g. OSPF (Open Shortest Path First) The new node, which from now on is called the new router contacts the DRC (Dynamic Router Configuration) server to get OSPF configuration information. The DRC server is located by one of the ways described above. The routing protocol, e.g. OSPF, is started to establish network connectivity between the new router and the rest of the network.

The new router starts it self up by sending a so-called hello message to inform the other routers within the intranetwork about its existence as a newly added router to the intranetwork.

In one embodiment of the inventive method the intranetwork is a part of a BSS (Base Station System) within a cellular system. In this case the new node is co-located in a BTS (Base Transceiver Station) which must start to act like a router. The BSS system will be described later.

Figure 2:
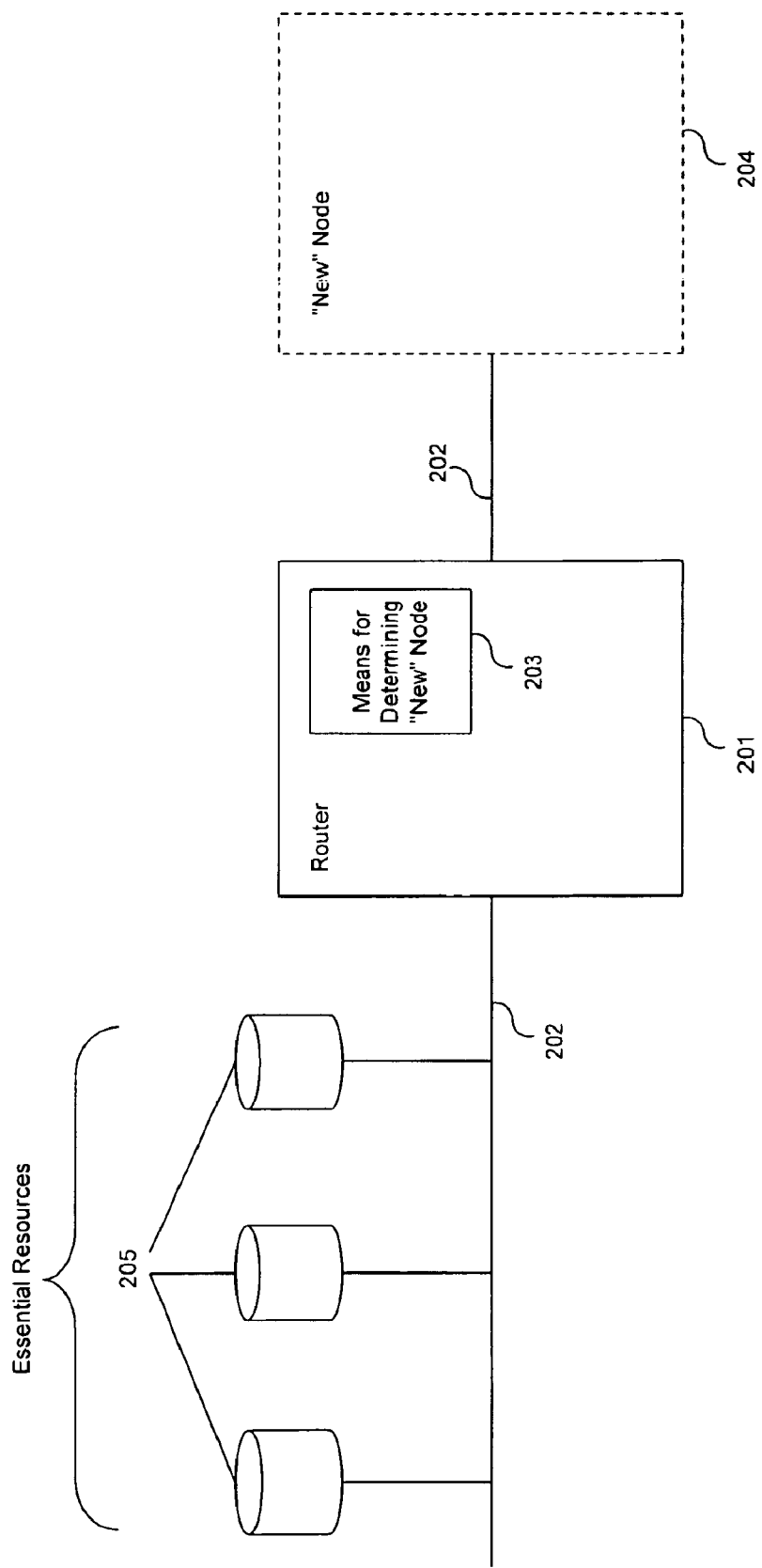
FIG. 2 shows a router according to the invention.

FIG. 2 shows a router 201 according to the invention. The router is a part of an IP intranetwork interconnected via Point to Point links 202 and the router has means for detecting 203 a new added node 204, connected to the router via a Point to Point link 202. The router is connected to essential resources 205, provided with configuration information. The new added router 204 identifies the essential resources and obtains configuration information via the router 201 and is automatically configured to act like a router.

Figure 3:
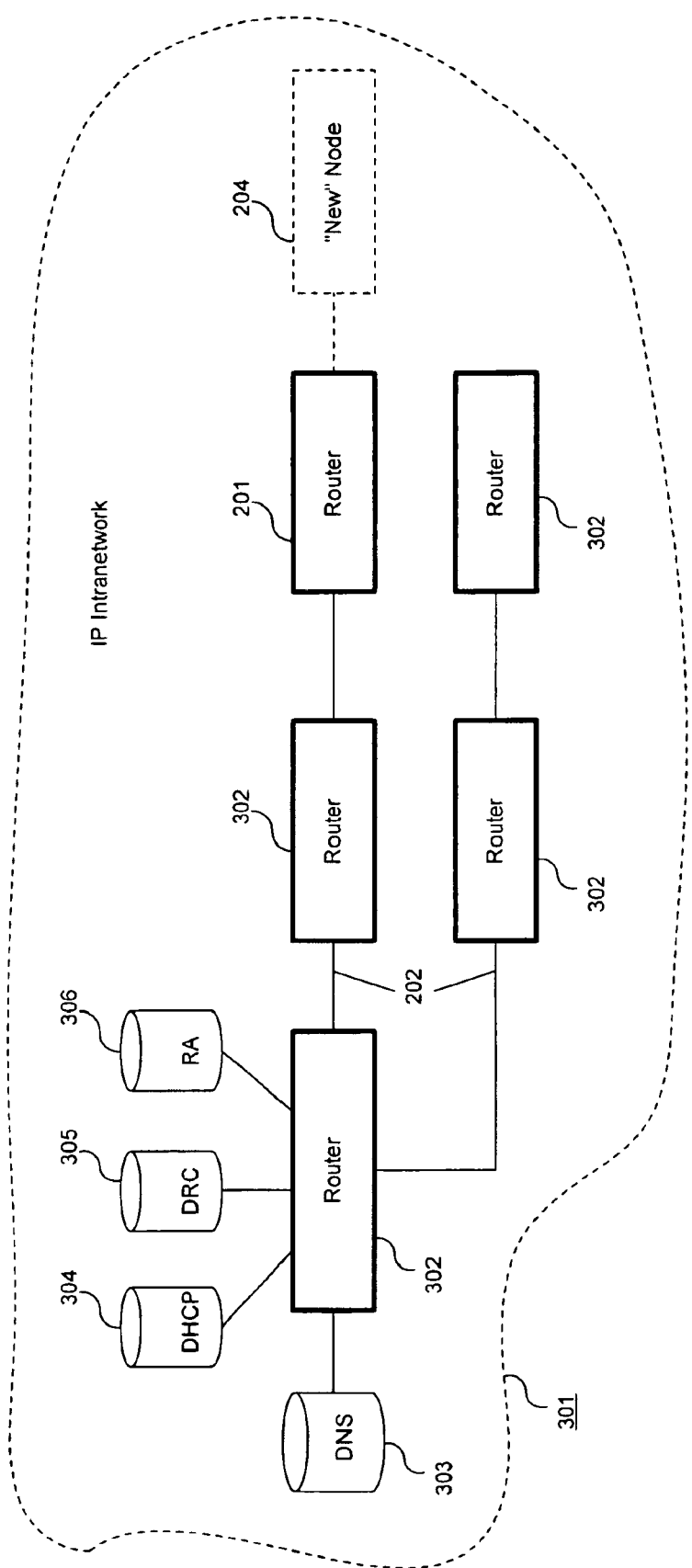
FIG. 3 shows an overview over a IP intranetwork according to the invention

FIG. 3 depicts an IP intranetwork 301 according to the invention. The intranet comprises routers 201, 302 according to the router described above and essential resources like e.g. DNS (Domain Name System) server 303, DHCP (Dynamic Host Configuration Protocol) server 304, a so-called DRC (Dynamic Router Configuration) server 305 and a so-called RA (Resource Allocation) server 306 which are provided with the essential configuration information, e.g. IP address, address mask, configuration information for the interface and intranetwork configuration information. The routers 204, 302 and the essential resources 303, 304, 305, 306 are interconnected via Point to Point links 202. When a new node 204, is added to an existing router 201 within the intranetwork 301, the new node 204 will automatically be configured to act like a router, by automatically contacting the essential resources to download configuration information, adjust relevant parameters and start it-self up as a router.

The DRC server 305 is a server that automatically provides the new node with configuration information e.g. OSPF (Open Shortest Path First) configuration information.

The RA server 306 controls the resources within the transmission network it obtains automatically configuration information about the network and allocates resources when resources are needed, so-called "on demand resource allocation".

Figure 4:
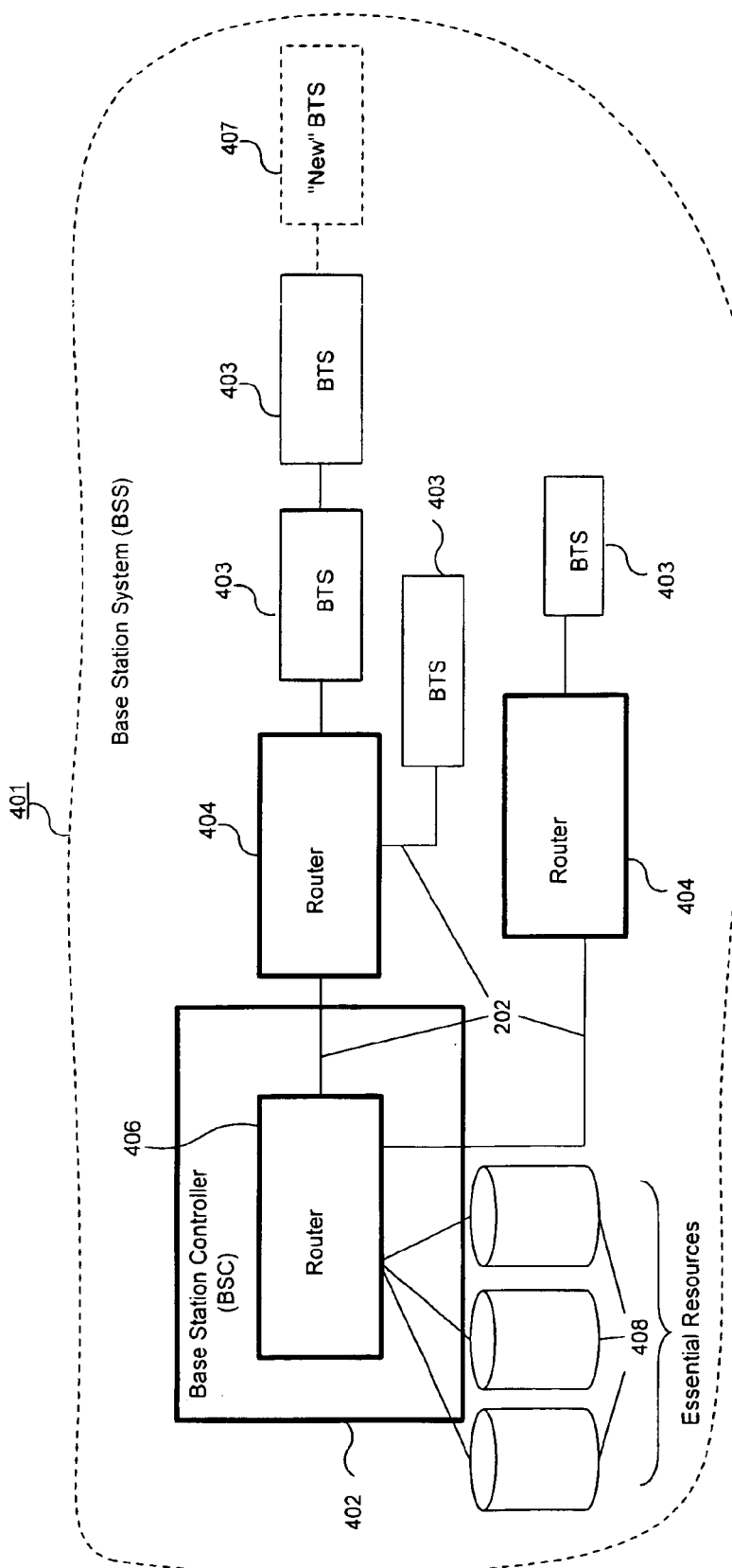
FIG. 4 shows an embodiment of the IP intranetwork according to the invention

FIG. 4 shows an embodiment of the present invention where the IP intranetwork is a part of a BSS (Base Station System) 401 within a cellular system. The BSS 401 comprises a BSC (Base Station Controller) 402 BTSs (Base Transceiver Station) 403 and standard routers 404 interconnected via Point to Point links 202. The BSC 402 is co-located with a router 406 according to the invention, described above, and the BTSs 403 are also co-located with a respective router according of the router of the invention, described above. When a new BTS 407 is connected to an existing BTS 403 or to a router 404 within the BSS 401 it must be configured. The first step is to configure the new BTS 407 to work as a host-BTS. However it must also be prepared for router operation when another BTS is connected in cascade. The IP intranetwork is connected to essential resources 408 provided with configuration information thus making it possible to autoconfigure the new BTS 407 to act like a router.

Figure 5:
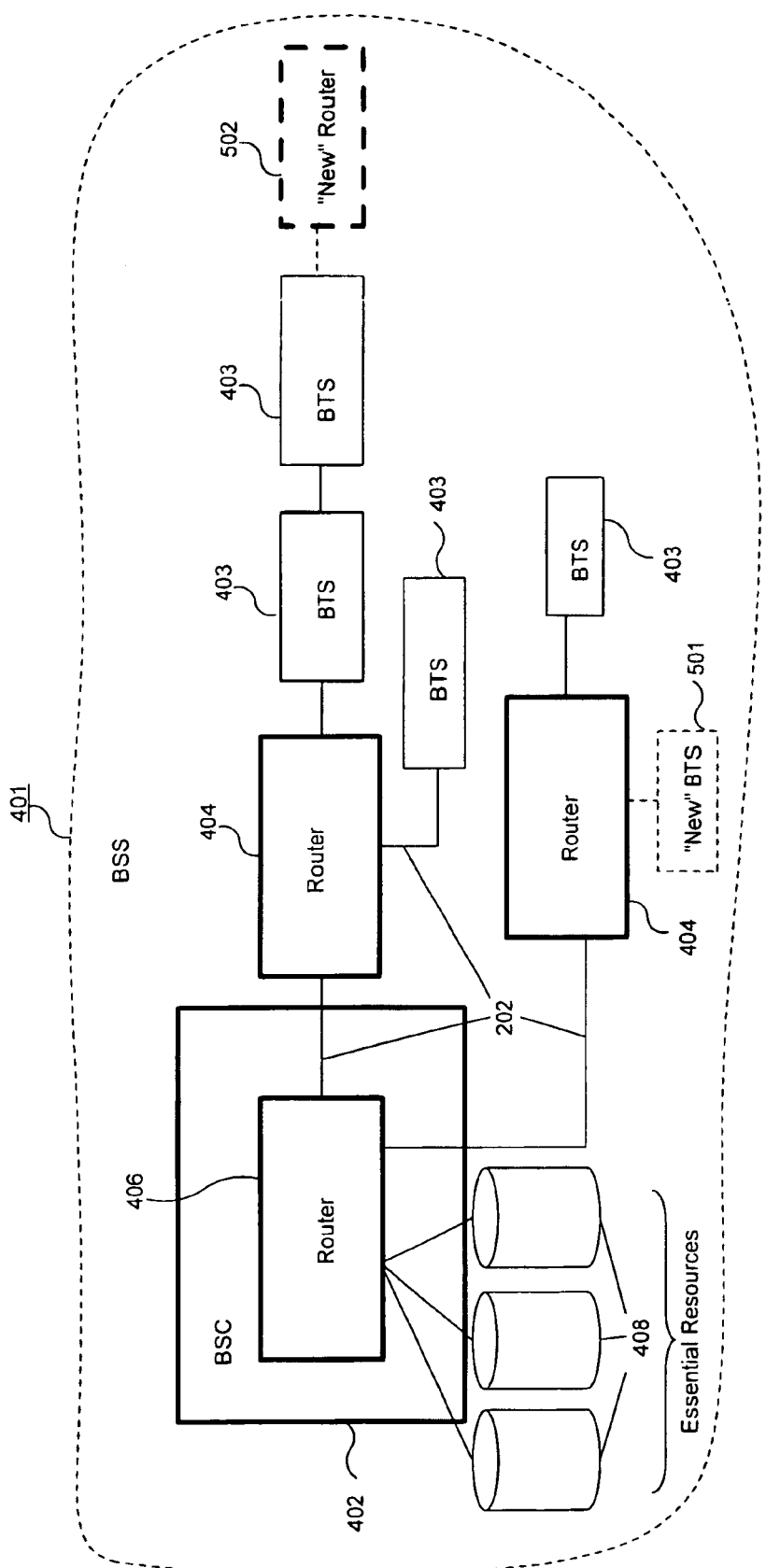
FIG. 5 shows another embodiment of the IP intranetwork according to the invention

Three possible changes to the network to automatically be configured are:

1. A new BTS 407 is connected to an existing BTS 403, illustrated in FIG. 4.
2. FIG. 5 shows an embodiment where a new BTS 501 is connected to a standard router 404.
3. FIG. 5 also illustrates another embodiment where a new router 502 is connected to a BTS 404.

Figure 6:
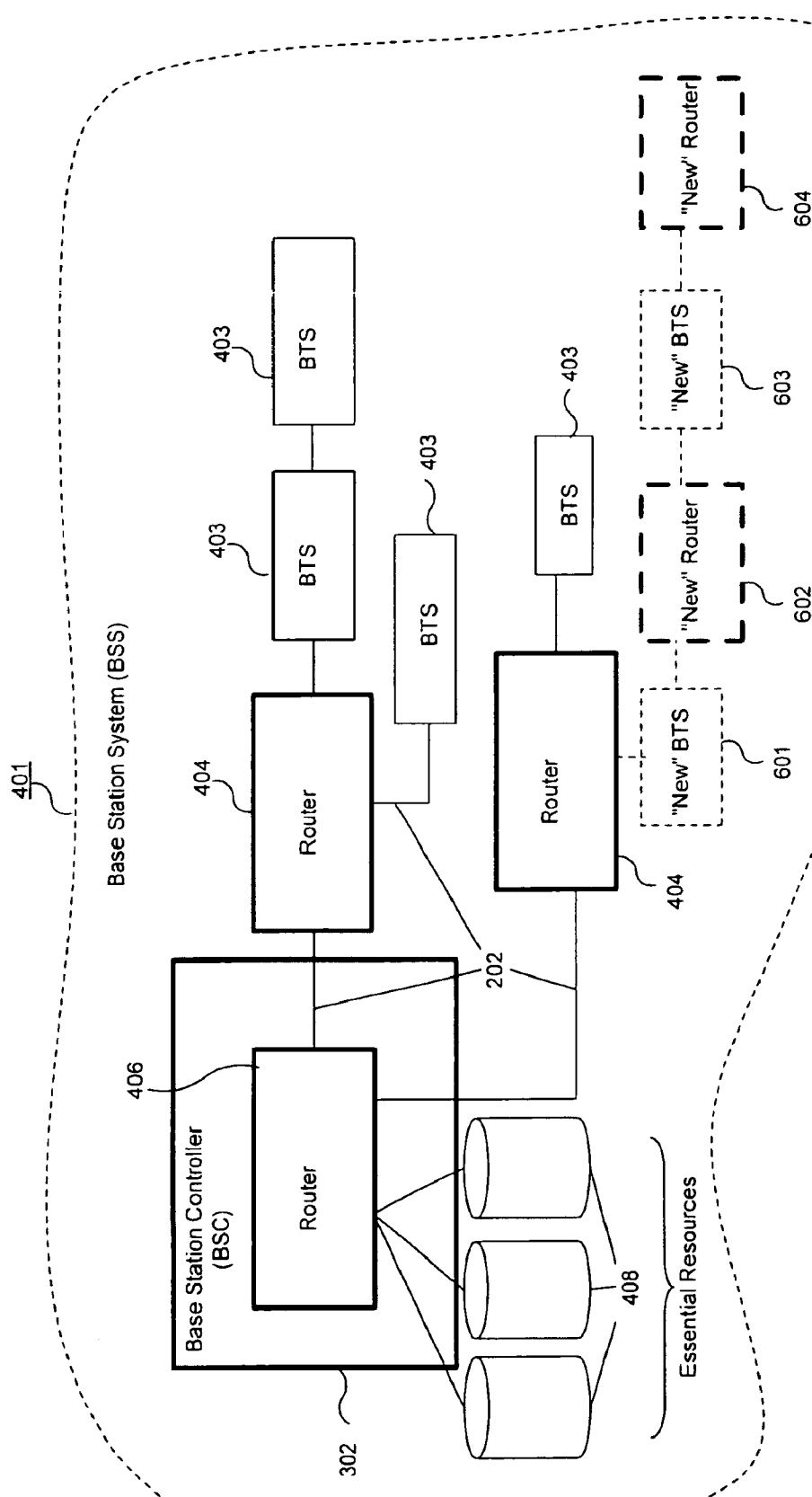
FIG. 6 shows another embodiment of the IP intranetwork according to the invention

FIG. 6 shows a set of new nodes comprising BTSs 601, 603 and standard routers 602, 604, added at the same time in cascade, i.e. in series connection. They are added to an existing router 404, but can also be added to an existing BTS co-located with a router. The set of nodes is autoconfigured, one by one, starting with the node 601 closest to the existing router 404 or BTS, when the node 601 is autoconfigured it is followed by the next node in series 602 and so on with node 603 and 604 until the complete set of nodes are autoconfigured.

Figure 7:
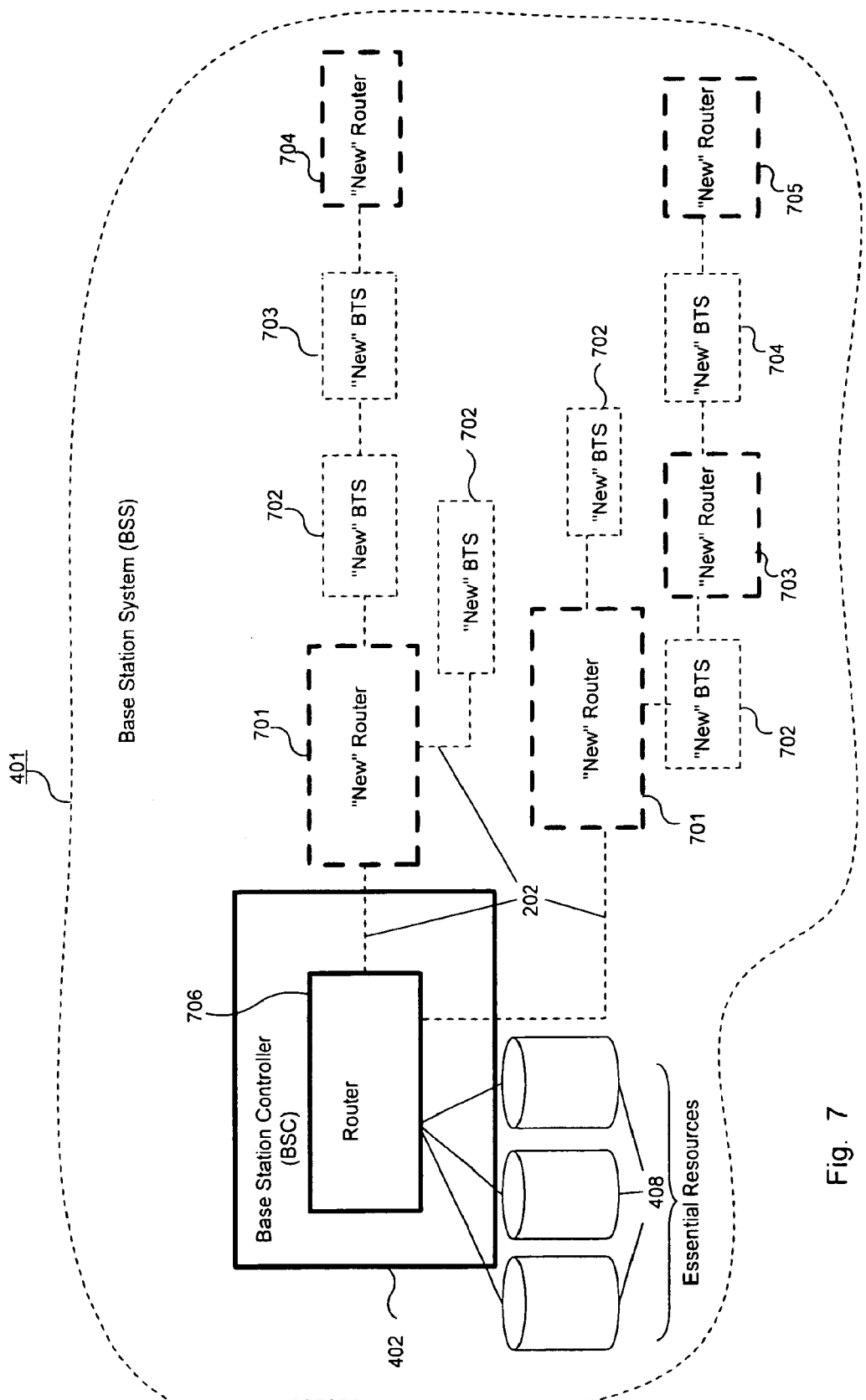
FIG. 7 shows yet another embodiment of the IP intranetwork according to the invention

FIG. 7 illustrates yet an embodiment of the invention where all routers 701, 703, 705 and BTS 702, 704 in the Intranet 401 are being autoconfigured except for one router 706 which already is configured and thus being the existing router. The routers/BTSs 701 closest to the existing router 706 starts the auto configuration, when they are configured they trig the autoconfiguration of the neighbour routers/BTSs 702 and when they are configured they trigs the autoconfiguration of their neighbour routers/BTSs 703, and so on 704, 705, 706 until the complete BSS is autoconfigured.

The invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. Method for auto-configuration of a router, the router being a part of an IP intranetwork, the IP intranetwork comprising routers interconnected via Point to Point links, said method comprising the steps of:

establishing a physical connection between the router and an existing router within the intranetwork;

establishing a Point to Point link between the router and the existing router, over the physical connection;

requesting and retrieving an IP address to make IP communication possible between the router and the existing router over the Point to Point link;

automatically identifying the resources which are essential for retrieving configuration information for the router;

automatically configuring the router by means of the configuration information; and starting a routing protocol to establish network connectivity between the router and the rest of the intranetwork;

wherein a set of additional routers to be autoconfigured is added to said router, in cascade, wherein the first of said additional routers, connected to said router, is autoconfigured according to the prior steps, and then comprising the further steps of:

starting the autoconfiguring of one of said additional routers closest connected to the last configured router; and repeating the former step until all of said additional routers in the set are autoconfigured.

2. The method according to claim 1 comprising the further step of providing the existing router with IP addresses, identifying said essential resources, thus making it possible for the new router to obtain the configuration information from the essential resources via the existing router.

3. The method according to claim 1, wherein the method comprising the further steps of providing the router with standard host names defined for the essential resources;

obtaining a DNS (Domain Name System) address during set-up of the Point to Point link; and using the DNS server to resolve the hostnames into IP addresses thus making it possible for the router to find the configuration information at the essential resources.

4. The method according to claim 1 comprising the further steps of obtaining a DHCP (Dynamic Host Configuration Protocol) address during the establishing of the Point to Point link; and using the DHCP server address, to identify the essential resources which provide the configuration information.

5. The method according to claim 1 comprising the further step of contacting one of the essential resources to obtain routing protocol configuration information.

6. The method according to claim 1, wherein the step starting a routing protocol is performed by, sending a "hello-message" to inform the other routers within the intranetwork that a new router is now a part of the intranetwork.

7. The method according to claim 1 wherein the IP intranetwork is a part of a BSS (Base Station System) within a cellular system and the router is co-located with a BTS (Base Transceiver Station) within the Intranet.

* * * * *

UNITED STATES PATENT AND TRADEMARK OFFICE
CERTIFICATE OF CORRECTION

| | | |
|---|---|---|
| PATENT NO. | : 6,856,602 B1 | Page 1 of 1 |
| APPLICATION NO. | : 09/594819 | |
| DATED | : February 15, 2005 | |
| INVENTOR(S) | : Westberg | |

It is certified that error appears in the above-identified patent and that said Letters Patent is hereby corrected as shown below:

On the Title Page, item (57), under "ABSTRACT", in Column 2, Line 10, after "router" insert -- over --.

In Column 7, Line 30, in Claim 2, delete "new" before "router".

Signed and Sealed this

Thirtieth Day of October, 2007

JON W. DUDAS
*Director of the United States Patent and Trademark Office*